July 11, 1967  S. ZELNICK  3,330,716
RADIANT FILM SEALING AND CUTTING APPARATUS
Filed Sept. 9, 1963
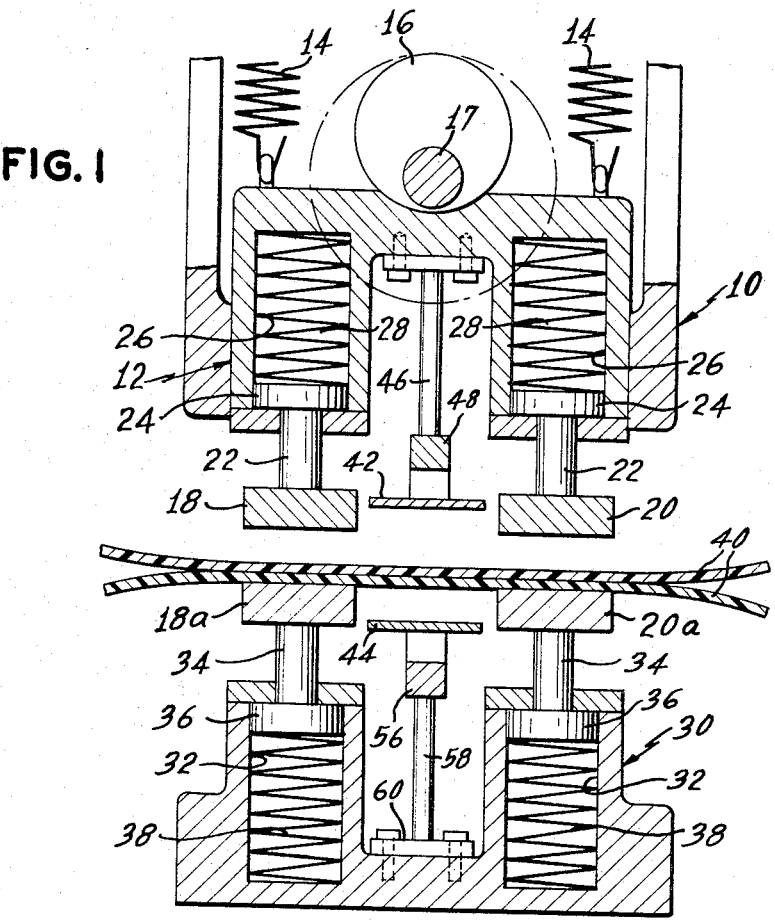
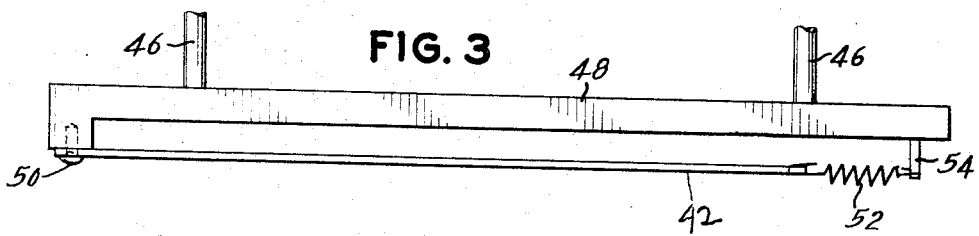
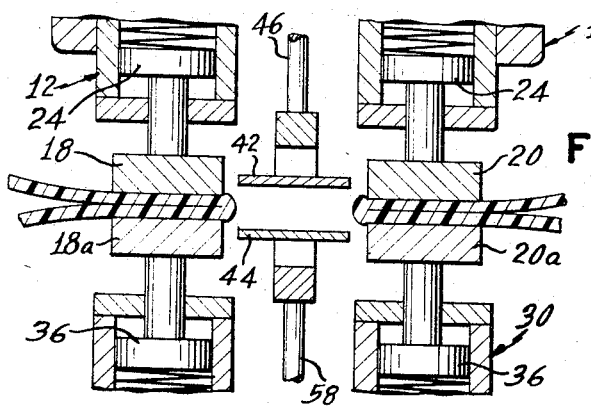
INVENTOR.
SEYMOUR ZELNICK
BY
ATTORNEY United States Patent Office 3,330,716
Patented July 11, 1967

3,330,716
RADIANT FILM SEALING AND CUTTING APPARATUS
Seymour Zelnick, Toms River, N.J., assignor to Weldotron Corporation, Newark, N.J., a corporation of New Jersey
Filed Sept. 9, 1963, Ser. No. 307,647
11 Claims. (Cl. 156—380)

This invention relates to an apparatus for heat sealing and cutting thermoplastic films for various purposes, for example, but without limitation, for packaging or wrapping, or for forming bags or other containers or articles, etc. by heat sealing and cutting superimposed thermoplastic films.

In my application, Ser. No. 263,837 filed Mar. 8, 1963, and now abandoned, there is disclosed a method of and apparatus for heat sealing and cutting thermoplastic films by heating the films by means of an electrically energized radiant heater, in the form of a thin metal strip, along a predetermined line disposed between two pairs of film clamping members, with the result that the films melt and part along said lines and a beaded edge is formed at the sealed edges of the films.

The primary object of the present invention is to provide a heat sealing and cutting technique of the radiant sealing type which, while operable to heat, seal and cut thermoplastic films in general, is especially useful for heat sealing and cutting thermoplastic films which are wrinkled or folded or which for other reasons are difficult to seal.

More specifically stated, the primary object of the present invention is to provide a heat sealing technique according to which the superimposed films are heated directly by radiant heating elements disposed at opposite sides of the assembly of superimposed films whereby both films are subjected simultaneously and directly to the sealing and cutting heat.

The above and other objects, features and advantages of the present invention will be fully understood from the following description considered in connection with the accompanying illustrated drawings of the presently preferred embodiment of the invention.

In the drawings:

FIG. 1 is a vertical sectional view of a heat sealing apparatus embodying the present invention, showing the superimposed films in position preliminary to the operation of the apparatus;

FIG. 2 is a vertical sectional view of part of the apparatus shown by FIG. 1, illustrating the operation of the apparatus for heating, sealing and cutting the superimposed films; and FIG. 3 is a side view of one of the heating elements and its support.

Briefly described, the method of the present invention comprises the steps of first pressing or clamping the superimposed film against each other between two pairs of clamping members, one pair of clamping members being spaced laterally of the other pair, and then subjecting the clamped films to the heat of radiant heating elements in the form of thin metal bands which have their wider surfaces parallel to the plane of the film and are in closed proximity to the film but out of contact therewith, whereby intense heat is applied to both surfaces of the superimposed film assembly and causes the two layers of film to melt, part, and flow back or recede to the edges of the clamping members where the edges of the two layers are sealed with the formation of beaded edges at the seals.

Referring now to the drawings in detail, the apparatus comprises a guide or frame 10 in which the clamping head 12 is slidably movable in any suitable way. As here shown, said clamping head is moved to the retracted position shown by FIG. 1 by tension springs 14 and may be moved downwardly to the projected position illustrated in FIG. 2 in any suitable way as by a cam or eccentric 16 secured to a shaft 17 journaled for turning movement in frame 10 and rotatable in any suitable way as by a manually or power operable crank or a lever mechanism (not shown). The clamping head 12 is provided with two clamping bars 18 and 20 which are disposed in laterally spaced relation and extend longitudinally in the direction of the lines at which the superimposed layers of film are to be sealed. Each of said bars is carried by a plurality of supporting members 22 spaced longitudinally of said bars, as will be readily understood, only one of said supporting members for each of said bars being shown. The supporting member 22 includes a guide member 24 which is slidable in a companion recess 26 in the guide head 12 against the force of a compression spring 28.

As shown by FIG. 2, upper clamping members 18 and 20 cooperate with companion lower clamping members 18a and 20a, respectively, in the manner illustrated by FIG. 2 and evident from a comparison of FIGS. 1 and 2. Said clamping members 18a and 20a are disposed in laterally spaced relation and extend longitudinally in confronting relation to the clamping members 18 and 20, respectively, as will be readily understood. The lower guide head 30 for clamping members 18a and 20a is stationary and comprises the guide recesses 32 which are similar to the guide recesses 26 for the upper clamping members 18 and 20. The lower clamping members 18a and 20a are carried by a plurality of longitudinally spaced supporting rods or studs 34, only one of said studs for each of said bars 18a and 20a being shown. The guide members 36 to which the said studs 34 are secured are movable in the guide recesses 32 and are spring loaded by the compression springs 38. It will be readily understood that the guide head 12 is moved downwardly into engagement to clamp the superimposed layers 40 of thermoplastic film resiliently but firmly between the companion clamping members 18 and 18a of one pair of clamping members and between the clamping members 20 and 20a of the other pair of clamping members.

As briefly described above, heat is applied to the adjacent surfaces of both layers of thermoplastic film when said layers are clamped together. For this purpose, upper and lower metal bands 42 and 44 are mounted in the apparatus. The radiant heating elements can be formed of any high resistance alloy, for example nichrome, and have a greater width than thickness. The dimensions of these radiant elements are not critical, although a suitable radiant element would have a width of one eighth of an inch (⅛″) and a thickness of .018 inch. The lower band 44 may be stationary, while the upper band is movable with the guide head 12 being supported thereby for movement toward and away from the thermoplastic films, as is evident from an inspection of FIG. 1 in comparison with FIG. 2.

The support for the upper radiant heating element 42 comprises a plurality of longitudinally spaced rods 46 secured to the guide head 12 in the space between the laterally spaced guide recesses 26. More specifically, radiant heating element 42 is carried by a bracket 48 which is secured to said rods 46 in any suitable way. In order to maintain radiant heating element 42 taut when it is heated by the passage of electric current therethrough, one end of said element is secured to bracket 48 in any suitable way as by a screw 50 and the opposite end of said radiant heating element is connected to one end of a tension spring 52, the other end of which is secured to a pin 54 fixed to bracket 48. It will be understood that if radiant heating element 42 expands longitudinally when heated, it is maintained taut by spring 52 and thereby prevented from sagging. The lower heating element 44 which is preferably stationary, although it could be movable, is positioned so that its upper surface is slightly below the adjacent surface of the lower film layer in the clamping condition of the two film layers illustrated in FIG. 2. A bracket support and device for maintaining the radiant element 44 in taut condition is provided, as indicated at 56, it being understood that said bracket and means for maintaining element 44 in taut condition is the same as that shown by FIG. 3, and that a plurality of rods 58 are connected to bracket 56 in longitudinally spaced relation in a manner generally similar to the connection of rods 46 to bracket 48 illustrated in FIG. 3. Bracket 56 is secured to the lower guide head 32 in any suitable way as by one or more cross members 60. It will be understood that the heating elements 42 and 44 are insulated from their metal supports and are each connected at its opposite ends to an electric current source.

The manner of practicing the method of the present invention is obvious from the above description, especially the brief description followed by the detailed description of the apparatus with reference to the drawings. Therefore, further description of the method or the operation of the apparatus is unnecessary. It is to be noted, however, that the portions of the film assembly which extend laterally beyond the clamps at the sealing line are heated simultaneously and directly at the opposite sides thereof by the radiant heating elements 42 and 44, respectively, as soon as the clamping operation takes place, whereby said portions are subjected to intense heat which rapidly melts said portions with flow to the adjacent sides, respectively, of the pairs of clamps resulting in the formation of sealed beaded edges of the film plies at said sides of the clamps.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Apparatus for heat sealing and cutting an assembly of superimposed plies of thermoplastic film, comprising means for pressing said films of the assembly against each other adjacent the sealing line with portions of said assembly extending laterally outwardly of said pressing means, and means for applying heat directly and simultaneously to each of the opposite sides of said laterally extending portions of said assembly and thereby fusing said superimposed films to each other and forming a sealed edge of the superimposed plies along said sealing line, said heat applying means comprising means for heating one side of said laterally extending portion of said assembly directly and additional means for heating directly the opposite side of said laterally extending portion of said assembly, each of said heat applying means comprising an electric radiant heating element comprising a band of high resistance material, said band being of greater width than thickness and disposed so that it lies widthwise in a plane parallel to and out of contact with said laterally extending portions of the assembly during the heating of said portions.

2. Apparatus for heat sealing and cutting an assembly of superimposed plies of thermoplastic films, comprising means for pressing the films of the assembly against each other adjacent both sides of the sealing line with portions of the assembly extending laterally free of said pressing means, and means for applying heat directly to each of the opposite sides of the laterally extending portions of the assembly and thereby fusing said superimposed films to each other and forming a sealed edge of the superimposed plies along the sealing line, said heat applying means comprising means for heating one side of the laterally extending portion of the assembly directly and additional means for heating directly the opposite side of the laterally extending portion of said assembly, said film pressing means comprising companion clamping members, one of said clamping members being movable toward the other of said clamping members to a projected position for the film pressing operation and movable to a retracted position to release the films, and one of said heating means being movable with said one of said clamping members to a first position adjacent one side of said assembly of said plies when said one of the clamping members is moved to said projected position and to a retracted position away from said plies when said one of said clamping members is moved to its said retracted position.

3. Apparatus for heat sealing and cutting an assembly of superimposed plies of thermoplastic films, comprising means for pressing said films of the assembly against each other adjacent the sealing line with portions of said assembly extending laterally outwardly of said pressing means, and means for applying heat directly simultaneously to each of the opposite sides of said laterally extending portions of said assembly and thereby fusing said superimposed films to each other and forming a sealed edge of the superimposed plies along said sealing line, said heat applying means comprising means for heating one side of said laterally extending portion of said assembly directly and additional means for heating directly the opposite side of said laterally extending portion of said assembly, each of said heat applying means comprising an electric radiant heating element comprising a band of high resistance material, said band being of greater width than thickness and disposed so that it lies widthwise in a plane parallel to and out of contact with said laterally extending portions of the assembly during the heating of said portions, said film pressing means comprising companion clamping members, one of said clamping members being movable toward the other of said clamping members to a projected position for the film pressing operation and movable to a retracted position to release the films, and one of said heating means being movable with said one of said clamping members to a first position adjacent one side of said assembly of said plies when said one of the clamping members is moved to said projected position and to a retracted position away from said plies when said one of said clamping members is moved to its said retracted position.

4. Apparatus for heat sealing and cutting an assembly of superimposed plies of thermoplastic films, comprising means for pressing the films of the assembly against each other adjacent both sides of the sealing line with portions of the assembly extending laterally free of said pressing means, and means for applying heat directly simultaneously to each of the opposite sides of the laterally extending portions of the assembly and thereby fusing the superimposed films to each other and forming a sealed edge of the superimposed plies along said sealing line, said film pressing means comprising companion clamping members, one of said clamping members being movable toward the other of said clamping members to a projected position for the film pressing operation and movable to a retracted position to release the films, and one of said heating means being movable with said one of said clamping members to a first position adjacent one side of said assembly of said plies when said one of the clamping members is moved to said projected position and to a retracted position away from said plies when said one of said clamping members is moved to its said retracted position.

5. Apparatus for heat sealing and cutting an assembly of superimposed plies of thermoplastic film along a sealing line comprising means for pressing the films of the assembly against each other adjacent both sides of the sealing line with portions of the assembly including the sealing line extending laterally free of said pressing means, and means for applying heat to the laterally extending portions of the assembly and thereby fusing the superimposed films to each other and forming a sealed edge of the superimposed plies along said sealing line, said heat applying means comprising an electrically heated band of greater width than thickness, disposed with its width in a plane parallel to said films for heating and melting the extending laterally free portions of the superimposed plies of film by heat radiating from the confronting width surface of said heat applying means.

6. Apparatus for heat sealing and cutting an assembly of superimposed plies of thermoplastic film along a sealing line, comprising means for pressing the films of the assembly against each other adjacent both sides of the sealing line with portions of the assembly including the sealing line extending laterally free of said pressing means, and means for applying heat directly and simultaneously to each of the opposite sides of the laterally extending portions of the assembly and thereby fusing the superimposed films to each other and forming a sealed edge of the superimposed plies along the sealing line, the heat applying means comprising two means for radiantly heating said side of the laterally extending portion of the assembly directly, each of heat applying means comprising an electric radiant heating element comprising a band of high resistance material, said band being of greater width than thickness and disposed so that its width lies in a plane parallel to and out of contact with said laterally extending portions of the assembly during at least part of time of the heating of said portions.

7. Apparatus for heat cutting and sealing superposed plies of thermoplastic film, comprising: a first support surface, and a second support surface spaced apart from said first support surface and defining a first lacuna therebetween; a third support surface, and a fourth support surface spaced apart from said third support surface and defining a second lacuna therebetween; said first and said second surfaces jointly, and said third and said fourth surfaces jointly, adapted to receive the superposed plies of film therebetween; a first radiant heat source mounted for movement in said first lacuna; a second radiant heat source mounted for movement in said second lacuna; means for moving said first and second support surfaces towards said third and fourth support surfaces from film plies remote positions to film plies engaging positions, whereby initially said first and third support surfaces jointly clamp the film plies and said second and fourth support surfaces jointly clamp the film plies providing a clamped portion of the film plies therebetween, and for moving said first and said second radiant heat sources from film plies remote positions to film plies proximal positions, whereby subsequently said radiant heat sources transmit heat to the clamped portion of the film plies, melting and forming a bisecting gap in said clamped portion, and fusing together the edges of the superposed plies of film bounding the bisecting gap.

8. Apparatus according to claim 7 wherein: said moving means includes a first base member and a second base member, mounted for relative movement towards and away from each other; actuating means for causing said relative movement; a first support member providing said first support surface, a second support member providing said second support surface, a third support member providing said third support surface, and a fourth support member providing said fourth support surface; said first and second support members being carried by said first base member and spring biased towards said third and fourth support members respectively; said third and fourth support members being carried by said second base member and spring biased towards said first and second support members respectively.

9. Apparatus according to claim 8 wherein: said first radiant heat source includes a first electrically powered heat radiator fixedly mounted to said first base member between said first and second support members; said second radiant heat source includes a second electrically powered heat radiator fixedly mounted to said second base member between said first and second support members; whereby when said actuating means causes said first and second base members to advance towards each other, said first and second support members and said first heat radiator respectively advance toward said third and fourth support members and said second heat radiator until said respective support surfaces engage and clamp the film plies therebetween, whereupon further advancing movement of said base members causes relative advancing movement of said first heat radiator with respect to said first and second support surfaces and relative advancing movement of said second heat radiator with respect to said third and fourth support surfaces.

10. Apparatus according to claim 9 wherein: each of said electrically powered heat radiators comprises a band of high resistance material, said band being of greater width than thickness and disposed so that its width lies in a plane which is parallel to the planes of the superposed plies of film.

11. Apparatus for heat sealing and cutting an assembly of superposed plies of thermoplastic film, comprising: two laterally spaced apart pairs of confronting clamping means, the clamping means of each pair for clamping therebetween the superposed plies; two relatively movable support means, each resiliently supporting one clamping means of each of said two pairs of clamping means, for traversing said two pairs together for clamping the plies and apart for releasing the plies; and at least one of said support means also supporting a radiant heating means for movement along a path between said two pairs of clamping means towards the clamped plies but short of contact with such clamped plies; whereby on relative movement towards each other of said support means said clamping means initially clamp the plies and subsequently said radiant heating means approaches the clamped plies but does not contact such clamped plies to melt a gap into such plies, the molten plastic from which, on cooling, forms a bead joining the clamped plies together.

References Cited
UNITED STATES PATENTS

| | | | |
|---|---|---|---|
| 2,358,455 | 9/1944 | Hallman | 156—466 |
| 2,423,237 | 7/1947 | Haslacher | 53—373 |
| 2,459,235 | 1/1949 | Hewitt et al. | 156—307 |
| 3,009,851 | 11/1961 | Madsen | 156—515 |
| 3,015,600 | 2/1962 | Cook | 156—515 |
| 3,131,623 | 5/1964 | Seefluth | 156—583 |

EARL M. BERGERT, *Primary Examiner.*

D. J. DRUMMOND, *Assistant Examiner.*